June 20, 1961     H. S. HORN     2,988,772
FILM STRETCHING
Filed May 26, 1958
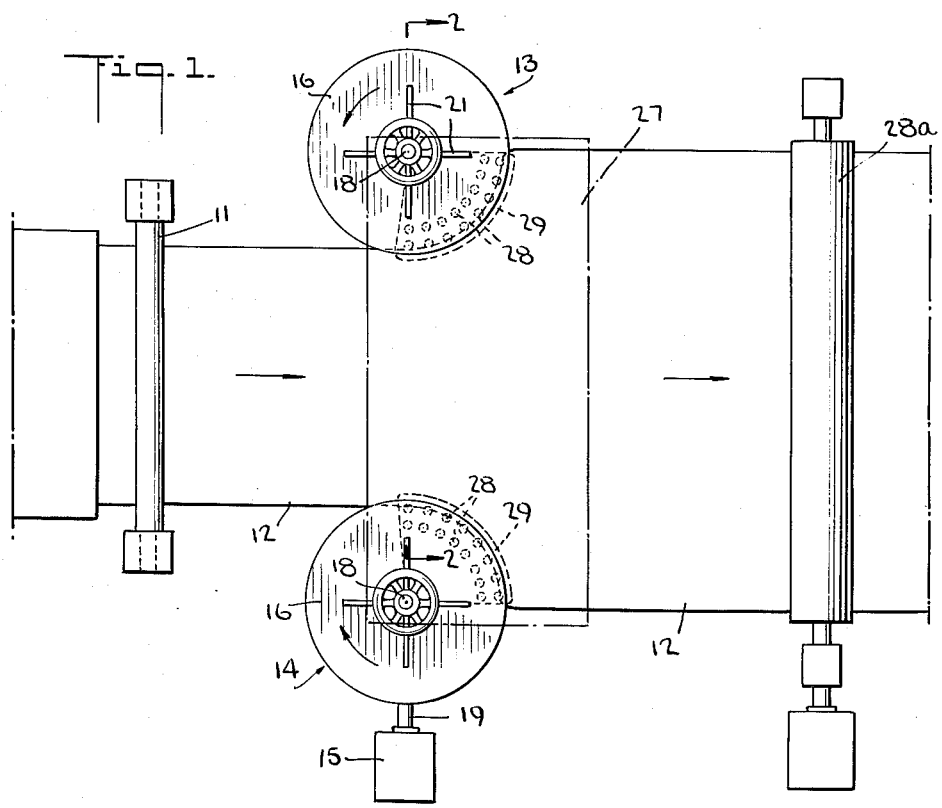
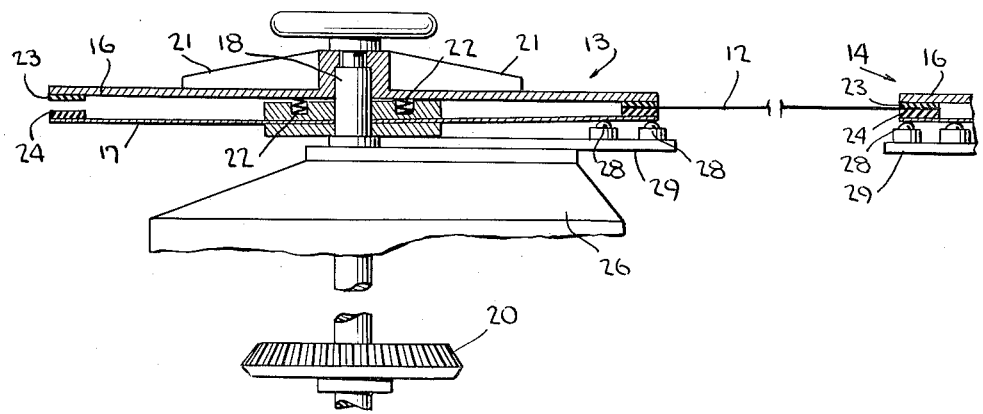

2,988,772
FILM STRETCHING
Harvey S. Horn, Bronx, N.Y., assignor to Celanese Corporation of America, New York, N.Y., a corporation of Delaware
Filed May 26, 1958, Ser. No. 737,926
7 Claims. (Cl. 18—1)

This invention relates to the stretching of plastic film and more particularly to stretching of crystalline plastic films to control the orientation of the crystals therein and to enhance the physical properties of the films.

It is known that the physical properties of crystalline plastic films may be considerably enhanced by stretching and particularly by bilateral stretching. Methods and apparatus have been devised for the bilateral stretching of plastic films but such methods and apparatus have been mechanically complicated because of the problems involved in continuously seizing, holding and releasing the moving edges of the film. Also, in many cases such methods and apparatus have been inflexible with respect to the amount of lateral stretch effected.

It is an object of this invention to provide a novel method and apparatus for stretching film which method and apparatus are mechanically simple and reliable and which are easily adjustable to different degrees of stretch. Other objects will appear hereinafter.

The objects of this invention are achieved by an apparatus having a means for moving the film in a plane in a longitudinal direction, a pair of rotatable discs mounted to rotate on either side of the plane of the film so that an edge of the film passes between the discs at a portion of the periphery thereof, the discs being mounted to rotate out of contact with each other and out of contact with the edge of the film passing between them, a deflecting member outside of at least one of the discs adapted to deflect said portion of its periphery into contact with the edge of the film and to deflect the edge of the film into contact with the other disc.

The invention may be more readily understood by reference to the accompanying drawings of which:

FIGURE 1 is a plan view of the invention showing the lateral stretching of a continuously moving film and FIGURE 2 is a cross sectional view, on an expanded scale, taken along section 2—2 of FIGURE 1.

In a specific embodiment of the invention, described with reference to the drawings, feeding roll 11 feeds a high density polyethylene film 12 at a linear rate of 50 feet per minute. The film has a density of .95 and a melt index of 5.0. It is 12 inches wide and 10 mils in thickness.

As the film 12 moves, its edges reach the left and right pairs of discs, shown in FIGURE 1, the left pair being indicated collectively as 13 and the right pair as 14. Pair 13 is rotated counter-clockwise (as viewed in plan) and pair 14 is rotated clockwise so that both pairs of discs are moving in the same direction at their nearest portions. The disc pairs are driven at the same rotational speed by disc drive 15, shown schematically.

Disc pair 13, as shown in FIGURE 2 is made up of an upper disc 16 and a lower disc 17 mounted to rotate on a shaft 18. The shaft 18 is driven by disc drive 15 through drive shaft 19 containing a bevel gear, not shown, which intermeshes with bevel gear 20. The upper disc 16 is supported on the shaft 18 by webs 21 and the lower disc 17 is supported at its center by being keyed into shaft 18.

Disc 16 is composed of a relatively rigid material, such as aluminum and disc 17 is composed of a flexible material, such as spring steel. They are about 36 inches in diameter and are spaced ⅛ inch apart. They rotate in planes parallel to the plane of the film 12 and on either side thereof at about 5 revolutions per minute.

The annular pads 23 and 24 line the periphery of the inner surface of discs 16 and 17, respectively. The ball bearings 28 which seat into segmented bearing block 29 deflect the spring steel disc 17 upward against the edge of the film, thereby clamping it against upper disc 16. The segment over which the bearing block and ball bearings act on disc 17 begins at that portion of disc 17 where it is closest to the discs of disc pair 14 on the opposite side of the film.

The edge of the film 12 is engaged by the annular rubber pads 23 and 24 and carried by the rotation of the discs through a portion of their arcuate path. In the specific embodiment described the pressure of the bearings against the lower disc keeps the discs in contact through about 82° of arc and thus permits the transmission of the edge of the film through an arcuate path of this extent.

The segmented bearing block 29 is rigidly attached to the housing 26, which does not rotate. The disc 17 is free to deflect to contact the film where it is urged upward by ball bearings 28 or be relieved by means of a releasing spring 22 to release the film after the film has been stretched.

Heaters, shown schematically in FIGURE 1 as 27, heat the film across its entire width to a temperature of about 225° F.

The plastic film 12, now expanded in width to about 20 inches taken up by take up-roll 28a which rotates sufficiently rapidly to take up the film at the linear rate of about 150 feet per minute, providing a longitudinal stretch of about 300%. The film on take-up roll 28a, after having been subjected to both lateral and longitudinal stretching has a gauge of about 1 mil. Additional double pairs of discs, similar to pairs 13 and 14, may be used, if desired, for additional lateral stretch.

It is to be understood that the invention is not limited to the precise details of the specific embodiment described above. The method is applicable to high density polyethylene films having densities between about .935 and about .970 and melt indices between about .01 and about 20. The invention is also applicable to other crystalline plastic films such as low density polyethylene films, polyvinyl chloride films, rubber hydrochloride films, polyethylene terephthalate films, secondary cellulose acetate films, triacetate cellulose films, and vinylidene chloride films.

The films usually used have initial thicknesses between about 3 and about 30 mils and final thicknesses between about 2.0 and about 0.5 mils. The arcuate path in each disc through which the edge of the film is carried may vary from 12° to 82° of arc and preferably from 12° to 60°. The degree of lateral stretch for each double pair of discs may conveniently comprise from about 20 to about 300% of the original lateral dimension. The total lateral stretch during the path of the film is generally between about 100 and about 300% of the original lateral dimension. For high density polyethylene films the total lateral stretch is preferably between about 100 and 300% of the original lateral dimension.

The total longitudinal stretch during the path of the film is generally between about 20 and about 300% of the original longitudinal dimension. For high density polyethylene the total longitudinal stretch is preferably between about 100 and about 300% of the original longitudinal dimension.

The temperature of the film in the area of lateral stretch may vary from about 130° to about 225° F.

The apparatus may be adjusted to provide any desired degree of longitudinal stretch by variation of the relative speeds of the feed roll and take-up roll. The apparatus may also be adjusted to any desired degree of lateral stretch in a given double pair of discs by the use of a ball bearing segment of appropriate width bringing the discs into contact over the desired arc.

It is to be understood that the foregoing detailed description is merely given by way of illustration and that many variations may be made therein without departing from the spirit of my invention.

Having described my invention, what I desire to secure by Letters Patent is:

1. Apparatus for continuously stretching plastic film in a lateral direction which comprises means for moving said film in a plane in a longitudinal direction, a pair of rotatable discs at least one of which is deflectable, said discs being mounted on a shaft to rotate in planes parallel to and on either side of the plane of said film so that an edge of said film passes between said discs at a portion of the periphery thereof, a deflecting member bordering said film and mounted outside of at least one of said discs and adapted to deflect said portion of its periphery into contact with said edge of said film and to deflect said edge of said film into contact with said other disc.

2. Apparatus for continuously stretching plastic film in a lateral direction which comprises means for moving said film in a plane in a longitudinal direction, two pairs of rotatable discs of equal diameter at least one disc of each pair being flexible, each pair mounted on a shaft to rotate in planes parallel to and on either side of the plane of said film, said pairs being oppositely disposed with respect to said film so that opposite edges of said film pass between the discs of each pair at a portion of the periphery thereof, a stationary deflecting member bordering said film and mounted outside of at least one of each pair said flexible discs and adapted to deflect said portion of its periphery into contact with an edge of said film and to deflect said edge of said film into contact with said other disc of the pair.

3. Apparatus for continuously stretching plastic film which comprises feed means for feeding film in a plane in a longitudinal direction, take-up means for taking up said film at a faster linear rate than it is fed by said feed means, two pairs of rotatable discs of equal diameter located between said feed means and said take-up means, at least one disc of each pair being flexible, each pair mounted on a shaft to rotate in planes parallel to and on either side of the plane of said film, said pairs being oppositely disposed with respect to said film so that opposite edges of said film pass between the discs of each pair at a portion of the periphery thereof, a stationary deflecting member bordering said film and mounted outside of at least one of each pair said flexible discs and adapted to deflect said portion of its periphery into contact with an edge of said film and to deflect said edge of said film into contact with said other disc of the pair.

4. The apparatus of claim 2 wherein each disc of each of said pairs is padded with a resilient material on the periphery of the inner face thereof.

5. The apparatus of claim 2 wherein said stationary deflecting member is adapted to deflect a portion of said disc corresponding to between about 12° and 82° of arc.

6. The apparatus of claim 2, further modified in that it includes a means for heating said film across its entire width in the vicinity of said discs.

7. Apparatus for continuously stretching plastic film in a lateral direction which comprises means for moving said film in a plane in a lateral direction, an even number of pairs of rotatable discs of equal diameter at least one disc of each pair being flexible, each pair mounted on a shaft to rotate in planes parallel to and on either side of the plane of said film, each two of said pairs being oppositely disposed with respect to said film so that opposite edges of said film pass between the discs of each pair at a portion of the periphery thereof, a stationary deflecting member bordering said film and mounted outside of at least one of each pair said flexible discs and adapted to deflect said portion of its periphery into contact with an edge of said film and to deflect said edge of said film into contact with said other disc of the pair.

References Cited in the file of this patent

UNITED STATES PATENTS

| | | |
|---|---|---|
| 1,280,139 | Bolin | Oct. 1, 1918 |
| 2,350,961 | Haskins | June 6, 1944 |
| 2,557,492 | Young | June 19, 1951 |
| 2,582,165 | Rosenfield | Jan. 8, 1952 |
| 2,719,323 | Thompson | Oct. 4, 1955 |
| 2,755,533 | Miller | July 24, 1956 |
| 2,778,057 | Clark | Jan. 22, 1957 |
| 2,895,171 | Holmes-Walker et al. | July 21, 1959 |